(12) United States Patent
Harashina et al.

(10) Patent No.: US 7,186,766 B2
(45) Date of Patent: Mar. 6, 2007

(54) POLYACETAL RESIN COMPOSITION AND PROCESS FOR PRODUCING THE SAME

(75) Inventors: Hatsuhiko Harashina, Fuji (JP); Hayato Kurita, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 301 days.

(21) Appl. No.: 10/609,411

(22) Filed: Jul. 1, 2003

(65) Prior Publication Data

US 2004/0010064 A1     Jan. 15, 2004

(30) Foreign Application Priority Data

Jul. 10, 2002    (JP)  ............................. 2002-201981

(51) Int. Cl.
     *C08K 5/3417*    (2006.01)
     *C08K 5/04*        (2006.01)
     *C08K 5/98*        (2006.01)
     *C08K 5/34*        (2006.01)

(52) U.S. Cl. ........................... 524/105; 524/88; 524/91; 524/94; 524/100; 524/102; 524/238; 524/240; 524/291; 524/394; 524/400; 524/430; 524/433; 524/436; 524/442; 524/495; 524/54

(58) Field of Classification Search ................ 524/238, 524/593, 594, 88, 91, 94, 100, 102, 105, 524/240, 291, 394, 400, 430, 433, 436, 442, 524/495

See application file for complete search history.

(56) References Cited

U.S. PATENT DOCUMENTS 6,642,289 B2 * 11/2003 Harashina et al. .......... 524/106

6,753,363 B1 * 6/2004 Harashina .................... 524/99

FOREIGN PATENT DOCUMENTS

| JP | 52-59646 | 5/1977 |
|---|---|---|
| JP | 61-145245 | 7/1986 |
| JP | 63-260949 | 10/1988 |
| JP | 5-98039 | 4/1993 |
| JP | 2001-72830 | 3/2001 |

OTHER PUBLICATIONS

Kobunshi Ronbunshu (Japanese Journal of Polymer Science and Technology), vol. 48, No. 7, pp. 443 to 447 (Jul. 1991).

* cited by examiner

*Primary Examiner*—Kriellion A. Sanders
(74) *Attorney, Agent, or Firm*—Nixon & Vanderhye, PC

(57) ABSTRACT

About 0.001 to 1 part by weight of a phenol component (B1) and/or about 0.001 to 10 parts by weight of an amino acid (B2) are added relative to 100 parts by weight of a polyacetal resin (A) to prepare a polyacetal resin composition. The phenol component (B1) may be a novolak phenol-series resin, a phenol aralkyl-series resin, a polyvinyl phenol-series resin, a polyhydric phenol, a polyphenol, a catechin compound, or a lignin. The amino acid (B2) may be an α-amino acid, a β-amino acid, a γ-amino acid, a δ-amino acid, or a derivative of an amino acid. The polyacetal resin composition may further contain an antioxidant, a heat stabilizer, a processing stabilizer, a weather (light)-resistant stabilizer, or a coloring agent. The polyacetal resin composition ensures marked inhibition of formaldehyde emission.

12 Claims, No Drawings

POLYACETAL RESIN COMPOSITION AND PROCESS FOR PRODUCING THE SAME

FIELD OF THE INVENTION

The present invention relates to a polyacetal resin composition in which an amount of formaldehyde emission (or generation) is inhibited, to a process of producing the same, and to a shaped or molded article formed with the composition.

BACKGROUND OF THE INVENTION

A polyacetal resin is excellent in mechanical property, fatigue resistance, friction or abrasion resistance, chemical resistance, and moldability. Therefore, the polyacetal resin has been widely utilized in various fields such as an automotive part, an electric or electronic device part, other precision machinery part, an architectural or pipeline part, a household utensil or cosmetic article part, or a medical device part. While, along with expansion or diversification in application, the polyacetal resin tends to be required highly developed quality. Characteristics (or properties) required for the polyacetal resin includes characteristics that mechanical strength in a process step such as an extruding step or a molding step is not deteriorated, that deposit to a metal mold (or mold deposit) is not generated, that mechanical property under a long-term heating condition (heat aging) is adversely affected, and that incomplete molding such as solver streak or void is not found in a shaped article. The degradation of the polymer upon heating is one of the important factors among these phenomena. In particular, the polyacetal resin is inherently unstable in an oxidative atmosphere at an elevated temperature or in an acidic or alkaline environment because of its chemical structure. Therefore, the essential need that must be fulfilled for a polyacetal resin is that of insuring high thermal stability and minimal emission (or generation) of formaldehyde in the course of processing and from shaped articles. Formaldehyde is chemically active and ready to be oxidized to formic acid to thereby adversely affect the heat resistance of resin and, when the resin is used as electric or electronic parts, cause corrosion of metallic contacts or their discoloration due to organic deposits, resulting in contact errors. Furthermore, formaldehyde as such contaminates the working environment for parts assembling and the ecology in the field of use of end products.

In order to stabilize chemically active terminals, the following methods are known: for a homopolymer, a method of esterifying by acetylation or other means of the terminal of the polymer; and for a copolymer, a method of copolymerizing trioxane and a monomer having an adjacent carbon bond (e.g., a cyclic ether or a cyclic formal), and then decomposing and removing unstable terminal sites to make the unstable terminal sites stable (or inactive) terminal sites. However, the main chain part of the polymer also causes cleavage (or fission) decomposition in a heating process. Inhibiting such a decomposition cannot be overcome by only the above-mentioned treatment, and practically, it is considered that addition of an antioxidant and other stabilizers is required for such inhibition.

However, even in the case blending these stabilizers, it is difficult to completely inhibit decomposition (or degradation) of the polyacetal resin. In practice, upon melt processing in an extruding step or a molding step for preparing a composition, the polyacetal resin undergoes an action of heat or oxygen inside of a cylinder of an extruder or a molding machine, thereby decomposing the main chain or generating formaldehyde from an insufficiently stabilized terminal thereof, as a result, working environment is worsen in a extruding and molding process. Moreover, in the case carrying out molding for a long period, a finely powdered substance or a tar-like substance is deposited on a metal mold (mold deposit), thereby decreasing working efficiency. In addition, the mold deposit is one of the ultimate causes in deteriorating the surface condition of the shaped article. Further, the polymer decomposition causes deterioration in mechanical strength of the resin, and discoloration thereof. From such a viewpoint, a good deal of effort is continued for ensuring more effective stabilizing formulation (or recipe) about the polyacetal resin.

As the antioxidant added to the polyacetal resin, a phenol-series (phenolic) compound having steric hindrance (hindered phenol), and an amine compound having steric hindrance (hindered amine) have been known. As other stabilizers, a specific nitrogen-containing compound such as melamine or a derivative thereof, a polyamide, or a polyacrylamide derivative, an amidine compound, an alkaline metal hydroxide, an alkaline earth metal hydroxide, and an organic or inorganic acid salt have been used. Moreover, antioxidants are generally used in combination with other stabilizers. However, even when such an additive(s) is/are used, it is difficult to give the polyacetal resin high stability.

Japanese Patent Application Laid-Open No. 59646/1977 (JP-52-59646A) discloses that a polyacetal resin composition obtained by adding an antioxidant, an alkyleneurethane and urea to a polyacetal copolymer is improved in stability for heat and oxidative atmosphere, and does not cause coloration. However, it is difficult to ensure significant inhibition of formaldehyde emission by only adding the antioxidant and urea to the polyacetal copolymer.

Japanese Patent Application Laid-Open No. 145245/1986 (JP-61-145245A) discloses a molding composition which is prepared by blending a small amount of an ionic salt of a low molecular weight copolymer obtained from an α-olefin and an α,β-ethylene-type (ethylenic) unsaturated carboxylic acid to an acetal polymer for improving thermal stability of a polyacetal. Moreover, this document discloses that a cyanoguanidine, a triazine, or the like is used as an amidine-series stabilizer.

Japanese Patent Application Laid-Open No. 260949/1988 (JP-63-260949A) discloses a polyacetal composition for molding obtained by adding an additive such as a hindered phenol, a metal salt of a hydroxycarboxylic acid, a lubricant, a nitrogen-containing heat stabilizer (melamine, an amidine compound such as cyanoguanidine), a nucleating agent, or an antistatic agent to a polyacetal resin. In this document, these additives contribute to improve resistance for yellow discoloration in heat aging, mechanical property, processing aptitude, stability for ultraviolet ray, and resistance for storage of static electricity.

According to these documents, heat stability, mechanical property, or molding workability may be improved, however, it is difficult to efficiently reduce formaldehyde emission. In addition, it is also difficult to add large amounts of the additives to the composition because these bleed (or leach) out from a shaped article formed with the composition.

On the other hand, it is also conceivable to combine a polyacetal resin with other material(s) for improving property of the polyacetal resin. However, the polyacetal resin has a low affinity or compatibility to other material(s) due to highly crystallinity thereof. For example, the polyacetal resin is known to have compatibility to only a novolak phenol resin among various polymers (KOBUNSHI RONBUNSHU (Japanese Journal of Polymer Science and Technology), Vol. 48, No. 7, pp. 443 to 447 (July, 1991)). Japanese Patent Application Laid-Open No. 98039/1993 (JP-5-98039A) discloses a biaxially stretched polyoxymethylene film composition comprising 50 to 99 parts by weight of a polyoxymethylene polymer and 50 to 1 parts by weight of a novolak phenol resin. This document describes that the composition comprising the polyoxymethylene polymer and the novolak phenol resin at a weight ratio [the former/the latter] of 99/1 has insufficiently stretching stability. However, the relative large amount of the phenol resin in this composition makes it difficult to express the properties of the polyoxymethylene polymer effectively.

Japanese Patent Application Laid-Open No. 72830/2001 (JP-2001-72830A) discloses a polyacetal resin composition comprising a polyacetal resin and a flame retardant, wherein the flame retardant comprises a phosphorus-containing compound and an aromatic compound which accelerates flame retardation in association with the phosphorus-containing compound. The aromatic compound includes a phenol novolak resin, a phenol aralkyl resin, an aromatic vinyl resin, or others. This literature also discloses that the proportion of the phosphorus-containing compound is 1 to 250 parts by weight per 100 parts by weight of the aromatic compound and the total amount of the phosphorus-containing compound and the aromatic compound is 1 to 100 parts by weight per 100 parts by weight of the polyacetal resin.

SUMMARY OF THE INVENTION

It is therefore an object of the present invention to provide a polyacetal resin composition conducive to a marked inhibition of formaldehyde emission by adding a small amount of an additive, and a process of producing the same, as well as an article as molded (or shaped) therefrom.

It is another object of the present invention to provide a polyacetal resin composition capable of inhibiting from bleeding (or exudation) of an additive, and a process of producing the same, as well as an article as molded (or shaped) therefrom.

It is still another object of the present invention to provide a resin composition capable of improving thermal stability, in particular melt stability in a molding process, of a polyacetal resin, and a process of producing the same, as well as an article as molded (or shaped) therefrom.

It is a further object of the present invention to provide a polyacetal resin composition adapted to inhibit emission of formaldehyde even under severe conditions to suppress deposition of decomposition products on the mold, blooming or bleeding of the decomposition products from a shaped article and thermal deterioration of the article, thus contributing to improving quality of the shaped article and upgrading of the moldability of the resin composition; and a process of producing the same, as well as an article as molded (or shaped) therefrom.

The inventors of the present invention made intensive studies to achieve the above objects and finally found that the combination use of a small amount of a phenol component and/or amino acid with a polyacetal resin ensures improvement in thermal (or heat) stability (in particular melt stability in a molding process) of a resin composition, and inhibits formaldehyde emission and/or the additive bleeding (or exudation) from the polyacetal resin composition. The present invention was accomplished based on the above findings.

That is, the polyacetal resin composition of the present invention comprises a polyacetal resin (A) and at least one member selected from the group consisting of a phenol component (B1) and an amino acid (B2), wherein the proportion of the phenol component (B1) is about 0.001 to 1 parts by weight and the proportion of the amino acid (B2) is about 0.001 to 10 parts by weight relative to 100 parts by weight of a polyacetal resin (A). The polyacetal resin composition may be substantially free from a phosphorus-containing flame retardant. The phenol component (B1) may comprise a resin of which a main chain or a side chain has an aromatic ring having a hydroxyl group [for example, a novolak phenol-series resin (e.g., a novolak random phenol-series resin, a high-orthonovolak phenol-series resin), a phenol aralkyl-series resin, a polyvinyl phenol-series resin (e.g., a vinylphenol homo- or copolymer)], a polyphenol [e.g., a polyhydric phenol, a bisphenol, a trisphenol, a catechin compound, a teanine, a tannin, a lignin], and the like. The amino acid (B2) may comprise an □amino acid (for example, a monoaminomonocarboxylic acid, a monoaminod icarboxylic acid, a diaminomonocarboxylic acid), a β-amino acid, a γ-amino acid and a δ-amino acid. The proportion of the phenol component (B1) may be about 0.001 to 0.7 part by weight relative to 100 parts by weight of the polyacetal resin (A). The proportion of the amino acid (B2) may be about 0.01 to 5 parts by weight relative to 100 parts by weight of the polyacetal resin (A). The resin composition may further comprise an antioxidant, a heat stabilizer, a processing stabilizer, a weather (light)-resistant stabilizer, a coloring agent, and others. The weight ratio of at least one member selected from the group consisting of the phenol component (B1) and the amino acid (B2) relative to the antioxidant may for example be about 99/1 to 10/90. The heat stabilizer may comprise (a) a basic nitrogen-containing compound, (b) a metal salt of an organic carboxylic acid, (c) an alkali or alkaline earth metal compound, (d) a hydrotalcite and (e) a zeolite, and the weight ratio of at least one member selected from the group consisting of the phenol component (B1) and the amino acid (B2) relative to the heat stabilizer may for example be about 99/1 to 10/90.

The present invention includes a process for producing a polyacetal resin composition, which comprises mixing at least one member selected from the group consisting of a phenol component (B1) and an amino acid (B2) with a polyacetal resin (A), wherein the proportion of the phenol component (B1) is about 0.001 to 1 part by weight and the proportion of the amino acid (B2) is about 0.001 to 10 parts by weight relative to 100 parts by weight of a polyacetal resin (A). The polyacetal resin composition may be substantially free from a phosphorus-containing flame retardant. The process may further comprise kneading and extruding the mixture with an extruder to prepare the composition. Also, the present invention includes a shaped article formed with the above-mentioned composition. The emission of formaldehyde from the shaped article which is maintained in a closed space for 24 hours at a temperature of 80° C. is about not more than 2 μg per one $cm^2$ of the surface area of the article. The shaped article of the present invention may for example be an automotive part, an electric or electronic device part, an architectural or pipeline part, a household utensil or cosmetic article part, a medical device part and a photographic device part.

DETAILED DESCRIPTION OF THE INVENTION

[(A) Polyacetal Resin]

The polyacetal resin is a macromolecular compound containing oxymethylene group (—CH$_2$O—) as a predominant constituent unit and includes a polyacetal homopolymer or polyoxymethylene (e.g., trade name "Delrin™", manufactured by DuPont, U.S.A.: trade name "Tenac™ 4010", manufactured by Asahi Kasei Corp.), and a polyacetal copolymer containing an oxymethylene unit and a comonomer unit (e.g., trade name "Duracon™", manufactured by Polyplastics Co., Ltd.). Referring to such a copolymer, the comonomer unit includes an oxyalkylene unit of about 2 to 6 carbon atoms (preferably about 2 to 4 carbon atoms), for example, oxyethylene group (—CH$_2$CH$_2$O—), oxypropylene group, and oxytetramethylene group. The content of the comonomer unit may be small and may be selected from the range of about 0.01 to 30 mole %, preferably about 0.03 to 20 mole % (e.g. 0.05 to 18 mole %), and more preferably about 0.1 to 15 mole %, relative to the whole polyacetal resin.

The polyacetal copolymer may for example be a copolymer containing two components, a terpolymer containing three components and so on. The polyacetal copolymer may also be a random copolymer, a block copolymer [e.g., Japanese Patent Publication No. 24307/1990 (JP-2-24307B), manufactured by Asahi Kasei Corp., trade name "Tenac™ LA", and "Tenac™ "], or a graft copolymer. Moreover, the polyacetal resin may have a linear (or straight) structure or branched structure, and may have a crosslinked structure. In addition, the end groups of the polyacetal resin may be stabilized by esterification with a carboxylic acid such as acetic acid or propionic acid, or an anhydride thereof, urethanation with an isocyanate compound, or etherification. Concerning the polyacetal resin, there is no particular limitation on the degree of polymerization, the degree of branching, or the degree of crosslinking, only provided it can be melt-molded. There is no particular restriction as to the molecular weight of the polyacetal resin, and, for example, the weight average molecular weight is about 5,000 to 500,000, preferably about 10,000 to 400,000.

The polyacetal resin may for example be produced by polymerizing an aldehyde (e.g., formaldehyde, paraformaldehyde, and acetaldehyde), or a cyclic ether (e.g., trioxane, ethylene oxide, propylene oxide, butylene oxide, styrene oxide, cyclohexene oxide, 1,3-dioxolane, 1,3-dioxane), a cyclic formal (e.g., diethylene glycol formal, 1,4-butanediol formal), or others. Further, as the copolymerizable component, an alkyl- or arylglycidyl ether (e.g., methylglycidyl ether, ethylglycidyl ether, phenylglycidyl ether, naphthylglycidyl ether), an alkylene or polyoxyalkylene glycol diglycidyl ether (e.g., ethylene glycol diglycidyl ether, triethylene glycol diglycidyl ether, butanediol diglycidyl ether), an alkyl- or aryl glycidyl alcohol, a cyclic ester (e.g., β-propiolactone), or a vinyl compound (e.g., styrene, vinyl ether) may be employed.

[(B) Formaldehyde-Inhibiting Component]

The formaldehyde-inhibiting component (B) includes a phenol component (B1) and an amino acid (B2). The formaldehyde-inhibiting component (B) is used as a formaldehyde scavenger or inhibitor. The component (B) may be used singly or in combination.

[(B1) Phenol Component]

The phenol component (B1) includes a resin of which a main chain or a side chain has an aromatic ring having a hydroxyl group (a phenol-series resin), or a polyphenol. The phenol-series resin includes, for example, a novolak phenol-series resin, a phenol aralkyl-series resin, a modified phenol resin [for example, a terpene phenol resin (e.g., a resin described in Japanese Patent Application Laid-Open No. 292214/1995 (JP-7-262214A), trade name "YS Polyster series" and "Mighty series" manufactured by Yasuhara Chemical Co., Ltd., trade name "TAMANOL" manufactured by Arakawa Chemical Industries, Ltd.); a rosin-modified (or rosin-containing) phenol resin (including a reaction product of the rosin-modified phenol resin with a polyhydric alcohol); an unsaturated hydrocarbon compound-modified phenol resin (e.g., a dicyclopentadiene-phenol polymer (such as a phenol resin described in Japanese Patent Application Laid-Open No. 291616/1986 (JP-61-291616A), Japanese Patent Application Laid-Open No. 201922/1987 (JP-62-201922A) or Japanese Patent Application Laid-Open No. 49181/1994 (JP-6-19181A)), a cyclopentadiene-phenol polymer (such as trade name "DPP-600M" manufactured by Nippon Petrochemicals Co., Ltd.)], and a polyvinyl phenol-series resin. The polyphenol includes a polyhydric phenol, a bisphenol, a trisphenol, a catechin compound, and a lignin. The phenol component(s) may be used singly or in combination.

(Novolak Phenol-Series Resin)

The novolak phenol-series resin includes a novolak phenol-series resin obtained from a reaction of a phenol component with an aldehyde.

As the phenol component, for example, there may be mentioned phenol, a $C_{1-20}$alkyl-phenol (preferably a $C_{1-10}$alkyl-phenol) (e.g., a cresol such as p- or m-cresol, a xylenol such as 3,5-xylenol, ethylphenol, propylphenol, butylphenol, t-butylphenol, octylphenol, nonylphenol, dodecylphenol), a cyanophenol, a polyhydric phenol (e.g., resorcin, catechol), an arylphenol (e.g., phenylphenol, benzylphenol, cumylphenol), a biphenol (e.g., biphenol), a bisphenol [e.g., 4,4'-isopropylidenediphenol (bisphenol A), 4,4'-methylenediphenol (bisphenol F), 4,4'-sulfonyldiphenol (bisphenol S), 4,4'-thiodiphenol, 4,4'-oxydiphenol], an aminophenol (e.g., aminophenol). Among these phenol components, phenol or an alkylphenol (preferably $C_{1-4}$alkyl-phenol), in particular phenol, is preferred. The phenol component(s) may be used singly or in combination.

The aldehyde includes, for example, an aliphatic aldehyde (e.g., formaldehyde, acetaldehyde, propionaldehyde), an aromatic aldehyde (e.g., benzaldehyde, hydroxybenzaldehyde, phenylacetaldehyde), a formaldehyde condensation product (e.g., trioxane, paraformaldehyde). Among these aldehydes, an aliphatic aldehyde, in particular formaldehyde, is preferred. The aldehyde(s) may be used singly or in combination.

As the novolak phenol-series resin, for example, there may be mentioned a novolak random phenol-series resin which has methylene bonds at random positions with respect to a phenolic hydroxyl group, a high-orthonovolak phenol-series resin which has methylene bonds mostly at ortho position with respect to a phenolic hydroxyl group (e.g., a resin having an ortho/para ratio of not less than 1).

The condensation reaction of the phenol component with the aldehyde is usually carried out in the presence or absence of an acid catalyst such as an inorganic acid (e.g., hydrochloric acid, sulfuric acid) or an organic acid (e.g., p-toluenesulfonic acid, oxalic acid). The molar ratio of the phenol component relative to the aldehyde [the former/the latter] is about 1/0.6 to 1/1.

Among these novolak phenol-series resins, a monomerless or dimerless resin having decreased content of residual (or free) phenols (e.g., a free monomer of a phenol, a dimer of a phenol) is preferred. Moreover, it is preferred that the novolak phenol-series resin is substantially free from an unreacted formaldehyde or methylol group. Specifically, it is preferred that, in the novolak phenol-series resin, the total content of the free monomer and dimer is not more than 20% by weight, preferably not more than 10% by weight, and more preferably not more than 5% by weight. The content of the free monomer is usually not more than 0.3% by weight, preferably not more than 0.2% by weight, and more preferably not more than 0.1% by weight. The monomerless resin or dimerless resin is available as trade name "SUMILITE RESIN PR-53647", trade name "SUMILITE RESIN PR-NMD-100 series", and trade name "SUMILITE RESIN PR-NMD-200 series" (manufactured by Sumitomo Durez Co., Ltd.). The novolak phenol-series resin(s) may be used singly or in combination.

Incidentally, the dimer of a phenol includes a reaction product of two phenol molecules as a raw material (e.g., phenol) with an aldehyde (e.g., formaldehyde).

The number average molecular weight of the novolak phenol-series resin is not particularly limited, and may for example be selected a range within about 300 to 50000, preferably about 300 to 10000, and more preferably about 300 to 8000.

(Phenol Aralkyl-Series Resin)

The phenol aralkyl-series resin includes a phenol aralkyl resin obtained by a reaction of an aralkyl with a phenol.

As the aralkyl, for example, there may be mentioned p-xylene glycol, a p-xylene glycol $C_{1-4}$alkyl ether (e.g., a dialkyl ether such as p-xylene glycol dimethyl ether, or p-xylene glycol diethyl ether), an acyloxyaralkyl (e.g., p-xylene-$\alpha,\alpha'$-diacetate), an aralkyldiol (e.g., p-xylene-$\alpha,\alpha'$-diol), and an aralkylhalide (e.g., p-xylene-$\alpha,\alpha'$-dichloride, p-xylene-$\alpha,\alpha'$-dibromide). Among these aralkyls, xylene glycol or an alkyl ether thereof, or an acyloxyaralkyl, in particular xylene glycol $C_{1-4}$alkyl ether, is preferred. The aralkyl(s) may be used singly or in combination.

The phenol includes the phenols exemplified in the section on the foregoing novolak phenol resin, in addition a naphthol. Among these phenols, phenol or an alkyl ($C_{1-4}$ alkyl) phenol, or a naphthol, in particular phenol or naphthol is preferred. The phenol(s) may be used singly or in combination.

The reaction of the aralkyl with the phenol is usually carried out in the presence or absence of a catalyst. For example, in the case using the aralkyl ether as the aralkyl, the reaction may be conducted in the presence of a catalyst, and in the case using the aralkyl halide as the aralkyl, the reaction may be conducted in the absence of a catalyst. The catalyst includes, for example, a Friedel and Crafts catalyst such as a $C_{1-4}$alkylsulfuric acid (e.g., dimethylsulfuric acid, diethylsulfuric acid), or a metal chloride (e.g., tin chloride, aluminum chloride). The molar ratio of the aralkyl relative to the phenol [the former/the latter] is about 1/1 to 1/3, and preferably about 1/1 to 1/2.5.

The phenol aralkyl-series resin may be available as trade name "MILEX" (manufactured by Mitsui Chemicals, Inc.), "SUMILITE RESIN PR-54443" (manufactured by Sumitomo Durez Co., Ltd.), or "Xylok" (manufactured by Albright & Wilson Corp.). Moreover, the preferred resin also includes an aralkyl resin described in Japanese Patent Application Laid-Open No. 351822/2000 (JP-2000-351822A). The phenol aralkyl-series resin(s) may be used singly or in combination.

The number average molecular weight of the phenol aralkyl-series resin is not particularly limited, and may for example be selected from a range within about 300 to 50000, preferably about 300 to 10000, and more preferably about 300 to 8000.

(Polyvinyl Phenol-Series Resin)

The polyvinyl phenol-series resin includes a homo- or copolymer of an aromatic vinyl monomer having a hydroxyl group, or a copolymer of the aromatic vinyl monomer and other copolymerizable monomer.

As the aromatic vinyl monomer having a hydroxyl group, for example, there may be mentioned vinylphenol, dihydroxystyrene, and others. The monomer(s) may be used singly or in combination.

Examples of the copolymerizable monomer are a (meth) acrylic monomer [e.g., (meth)acrylic acid, a $C_{1-18}$alkyl (meth)acrylate such as methyl (meth)acrylate, ethyl (meth) acrylate, butyl (meth)acrylate or 2-ethylhexyl (meth)acrylate, a hydroxyl group-containing (meth)acrylic acid or a hydroxyl-$C_{1-18}$alkyl ester such as 2-hydroxyethyl (meth) acrylate, a glycidyl group-containing (meth)acrylic acid or a glycidyl-$C_{1-18}$alkyl ester such as glycidyl (meth)acrylate, (meth)acrylamide, (meth)acrylonitrile], a styrenic monomer (e.g., styrene, vinyltoluene, $\alpha$-methylstyrene, chlorostyrene, vinylnaphthalene, vinylcyclohexane), a polycarboxylic acid (e.g., phthalic acid, maleic acid), a maleimide-series monomer (e.g., maleimide, an N-$C_{1-4}$alkylmaleimide such as N-methylmaleimide, an N-arylmaleimide such as N-phenylmaleimide), a diene-series monomer (e.g., isoprene, 1,3-butadiene, 1,4-hexadiene, dicyclopentadiene), and a vinyl-series monomer (e.g., a vinyl ester such as vinyl acetate or vinyl propionate, a vinyl ketone such as methyl vinyl ketone or methyl isopropenyl ketone, a vinyl ether such as vinyl isobutyl ether or vinyl methyl ether, a nitrogen-containing vinyl monomer such as N-vinylcarbazole, N-vinylpyrrolidone or N-vinylimidazole). The copolymerizable monomer(s) may be used either singly or in combination.

The weight ratio of the hydroxyl group-containing aromatic vinyl monomer relative to the copolymerizable monomer [the former/the latter] is, for example, about 10/90 to 100/0, preferably about 30/70 to 100/0, and more preferably about 40/60 to 100/0.

Among these polyvinyl phenol-series resins, the preferred resin includes a vinylphenol homopolymer (polyhydroxystyrene), a copolymer of a vinylphenol monomer and a (meth)acrylic monomer, in particular a p-vinylphenol homopolymer and a copolymer of p-vinylphenol and a (meth)acrylic monomer. The polyvinyl phenol-series resin(s) may be used singly or in combination.

The number average molecular weight of the vinylphenol-series resin is not particularly limited, and may for example be selected from a range within about 300 to 500000, preferably about 400 to 300000, and more preferably about 500 to 100000 (in particular about 500 to 50000).

(Polyphenol)

The polyphenol includes a polyhydric phenol, a bisphenol, a trisphenol, a catechin compound [for example, catechin, epicatechin, gallocatechin, epigallocatechin, epicatechingallate, epigallocatechingallate, quercetin, caempherol, myricetin, and for example, these are available as "SUNFLAVON series (e.g., HG, P)" from Taiyo Kagaku Co., Ltd.], a teanine, a tannin, a lignin, and others.

The polyhydric phenol includes a dihydric phenol such as catechol, resorcin, hydroquinone, or 2,6-dihydroxynaphthalene; a trihydric phenol such as pyrogallol, or phloroglucin; phenollignin; gallic acid; and the like.

As the bisphenol, for example, there may be mentioned a biphenol such as 4,4-biphenol or 3,3-diphenyl-4,4-dihydroxybiphenyl; a bis(hydroxyaryl)alkane such as bis(4-hydroxyphenyl)methane, bis(4-hydroxyphenyl)phenylmethane, bis(4-hydroxyphenyl)naphthylmethane, bis(4-hydroxyphenyl)(4-isopropylphenyl)methane, bis(3,5-dichloro-4-hydroxyphenyl)methane, bis(3,5-dimethyl-4-hydroxyphenyl)methane, 1,1-bis(4-hydroxyphenyl)ethane, 1-naphthyl-1,1-bis(4-hydroxyphenyl)ethane, 1-phenyl-1,1-bis(4-hydroxyphenyl)ethane, 1,2-bis(4-hydroxyphenyl)ethane, 2-methyl-1,1-bis(4-hydroxyphenyl)propane, 2,2-bis(4-hydroxyphenyl)propane, 2,2-bis(3,5-dimethyl-4-hydroxyphenyl)propane, 1-ethyl-1,1-bis(4-hydroxyphenyl)propane, 2,2-bis(3,5-dichloro-4-hydroxyphenyl)propane, 2,2-bis(3,5-dibromo-4-hydroxyphenyl)propane, 2,2-bis(3-chloro-4-hydroxyphenyl)propane, 2,2-bis(3-methyl-4-hydroxyphenyl)propane, 2,2-bis(3-fluoro-4-hydroxyphenyl)propane, 1,1-bis(4-hydroxyphenyl)butane, 2,2-bis(4-hydroxyphenyl)butane, 1,4-bis(4-hydroxyphenyl)butane, 2,2-bis(4-hydroxyphenyl)pentane, 4-methyl-2,2-bis(4-hydroxyphenyl)pentane, 2,2-bis(4-hydroxyphenyl)hexane, 4,4-bis(4-hydroxyphenyl)heptane, 2,2-bis(4-hydroxyphenyl)nonane, 1,10-bis(4-hydroxyphenyl)decane, or 2,2-bis(4-hydroxyphenyl)-1,1,1,3,3,3-hexafluoropropane; a dihydroxydiarylcycloalkane such as 1,1-bis(4-hydroxyphenyl)cyclohexane, 1,1-bis(3,5-dichloro-4-hydroxyphenyl)cyclohexane, 1,1-bis(4-hydroxyphenyl)cyclodecane, or 1,1-bis(4-hydroxyphenyl)-3,3,5-trimethylcyclohexane; a dihydroxyarylalkylbenzene such as 1,4-bis(4-hydroxyphenylisopropyl)benzene; a dihydroxydiarylsulfone such as bis(4-hydroxyphenyl)sulfone, bis(3,5-dimethyl-4-hydroxyphenyl)sulfone, or bis(3-chloro-4-hydroxyphenyl)sulfone; a dihydroxydiarylether such as bis(4-hydroxyphenyl)ether, or bis(3,5-dimethyl-4-hydroxyphenyl)ether; a dihydroxydiarylketone such as 4,4'-dihydroxybenzophenone, or 3,3',5,5'-tetramethyl-4,4'-dihydroxybenzophenone; a dihydroxydiarylsulfide such as bis(4-hydroxyphenyl)sulfide, bis(3-methyl-4-hydroxyphenyl)sulfide, or bis(3,5-dimethyl-4-hydroxyphenyl)sulfide; a dihydroxydiarylsulfoxide such as bis(4-hydroxyphenyl)sulfoxide; a dihydroxydiphenyl such as 4,4'-dihydroxydiphenyl; a dihydroxydiarylfluorene such as 9,9-bis(4-hydroxyphenyl)fluorene; and others.

Moreover, other polyphenol includes, for example, 2,4,4'-trihydroxybenzophenone, 2,2',4,4'-tetrahydroxybenzophenone, 2,4,4'-trihydroxyphenyl ether, 2,2',4,4'-tetrahydroxy phenyl ether, 2,4,4'-trihydroxydiphenyl-2-propane, 2,2'-bis(2,4-dihydroxyphenyl)propane, 2,2',4,4'-tetrahydroxydiphenylmethane, 2,4,4'-trihydroxydiphenylmethane, 1-[α-methyl-α-(4'-dihydroxyphenyl)ethyl]-3-[α',α'-bis(4"-hydroxyphenyl)ethyl]benzene, 1-[α-methyl-α-(4'-dihydroxyphenyl)ethyl]-4-[α',α'-bis(4"-hydroxyphenyl)ethyl]benzene, α,α',α"-tris(4-hydroxyphenyl)-1,3,5-triisopropylbenzene, 2,6-bis(2-hydroxy-5'-methylbenzyl)-4-methylphenol, 4,6-dimethyl-2,4,6-tris(4-hydroxyphenyl)-2-heptene, 4,6-dimethyl-2,4,6-tris(4-hydroxyphenyl)-2-heptane, 1,3,5-tris(4-hydroxyphenyl)benzene, 1,1,1-tris(4-hydroxyphenyl)ethane, 2,2-bis[4,4-bis(4-hydroxyphenyl)cyclohexyl]propane, 2,6-bis(2-hydroxy-5-isopropylbenzyl)-4-isopropylphenol, bis[2-hydroxy-3-(2'-hydroxy-5'-methylbenzyl)-5-methylphenyl]methane, bis[2-hydroxy-3-(2'-hydroxy-5'-isopropylbenzyl)-5-methylphenyl]methane, tetrakis(4-hydroxyphenyl)ethane, tris(4-hydroxyphenyl)phenylmethane, 2',4',7-trihydroxyflavan, 2,4,4-trimethyl-2',4',7-trihydroxyflavan, 1,3-bis(2,4-dihydroxyphenylisopropyl)benzene, tris(4-hydroxyphenyl)-amyl-s-triazine, tris(4-hydroxybenzyl)isocyanurate, or others.

The phenol component(s) may be used singly or in combination.

[(B2) Amino Acid]

As the amino acid, there may be exemplified an α-amino acid, a β-amino acid, a γ-amino acid, a δ-amino acid, and the like.

(α-Amino Acid)

The α-amino acid includes a monoaminomonocarboxylic acid (e.g., glycine, alanine, valine, norvaline, leucine, norleucine, isoleucine, phenylalanine, tyrosine, diiodotyrosine, surinamine, threonine, serine, proline, hydroxyproline, tryptophan, methionine, cystine, cysteine, citrulline, α-aminobutyric acid, hexahydropicolinic acid, teanine), a monoaminodicarboxylic acid (e.g., aspartic acid, glutamic acid, asparagine, glutamine, hexahydrodipicolinic acid, hexahydroquinolinic acid), a diaminomonocarboxylic acid (e.g., lysine, hydroxylysine, arginine, histidine), or others.

(β-, γ-, or δ-Amino Acid)

As the β-amino acid, γ-amino acid, and δ-amino acid, there may be exemplified β-alanine, β-aminobutyric acid, hexahydroxycinchomeronic acid, γ-aminobutyric acid, δ-amino-n-valeric acid, and others.

The amino acid(s) may be a D-, L-, or DL-form. The amino acid also includes an amino acid derivative of which a carboxyl group is subjected to metal salination (e.g., an alkali metal salt, an alkaline earth metal), amidation, hydrazidation, or esterification (e.g., methyl esterification, ethyl esterification).

Further, the amino acid may be carried on (or supported with) a porous material (e.g., silica gel, alumina, titania, zirconia, sepiolite, smectite, palygorskite, imogolite, zeolite, activated carbon), or may form a inclusion or clathrate compound with a host (e.g., α, β-, γ-, or δ-cyclodextrin).

The amino acid(s) may be used singly or in combination.

The proportion of the formaldehyde-inhibiting component (B) may for example be about 0.001 to 10 parts by weight and preferably about 0.001 to 5 parts by weight relative to 100 parts by weight of the polyacetal resin (A).

The proportion of the phenol component (B1) is, for example, about 0.001 to 1 part by weight, preferably about 0.001 to 0.7 (e.g., about 0.01 to 0.7) part by weight, and more preferably about 0.001 to 0.5 (e.g., about 0.03 to 0.5) part by weight (in particular about 0.005 to 0.5 (e.g., about 0.05 to 0.5) part by weight) relative to 100 parts by weight of the polyacetal resin (A). In the case where the phenol component (B1) is a novolak phenol-series resin, the proportion of the novolak phenol-series can be selected from the range of not more than 1 part by weight (e.g., about 0.001 to 1 part by weight) relative to 100 parts by weight of the polyacetal resin (A).

Moreover, the proportion of the amino acid (B2) is, for example, about 0.001 to 10 parts by weight, preferably about 0.01 to 5 parts by weight, and more preferably about 0.03 to 3 parts by weight (in particular about 0.05 to 1 part by weight) relative to 100 parts by weight of the polyacetal resin (A).

In the case using the phenol component (B1) in combination with the amino acid (B2), the weight ratio of the phenol component (B1) relative to the amino acid (B2) may for example be about 1/99 to 99/1 (e.g., about 10/90 to 90/10), preferably about 20/80 to 80/20, and more preferably about 30/70 to 70/30.

In the present invention, the use of a small amount of the phenol component and/or amino acid insures efficient inhibition of formaldehyde emission and/or additive bleeding (or exudation) from a resin composition. Moreover, since the amount of the phenol component and/or amino acid is small, characteristics of the polyacetal resin (A) do not deteriorate.

Incidentally, it is preferred that the polyacetal composition of the present invention is substantially free from a phosphorus-containing flame retardant.

[Additive]

The resin composition of the present invention may comprise an additive such as an antioxidant, a heat stabilizer, a processing stabilizer, a weather (light)-resistant stabilizer, or a coloring agent. The additive(s) may be used singly or in combination.

(Antioxidant)

The antioxidant includes, for example, a phenol-series, an amine-series, a phosphorus-containing (or phosphorus-series), a sulfur-containing (or sulfur-series), a hydroquinone-series, a quinoline-series, or other antioxidant.

The phenol-series antioxidant includes a hindered phenol, for example, 2,2'-methylenebis(4-methyl-6-t-butylphenol), 4,4'-methylenebis(2,6-di-t-butylphenol), 2,6-di-t-butyl-p-cresol, 1,3,5-trimethyl-2,4,6-tris(3,5-di-t-butyl-4-hydroxybenzyl)benzene, 1,6-hexanediol-bis[3-(3,5-di-t-butyl-4-hydroxyphenyl)propionate], pentaerythritoltetrakis[3-(3,5-di-t-butyl-4-hydroxyphenyl)propionate], triethylene glycol-bis[3-(3-t-butyl-5-methyl-4-hydroxyphenyl)propionate], n-octadecyl-3-(4',5'-di-t-butylphenyl)propionate, stearyl-2-(3,5-di-t-butyl-4-hydroxyphenyl)propionate, 2-t-butyl-6-(3-t-butyl-5-methyl-2-hydroxybenzyl)-4-methylphenylacrylate, 4,4'-thiobis(3-methyl-6-t-butylphenol), or the like.

The amine-series antioxidant includes a hindered amine, for example, 4-methoxy-2,2,6,6-tetramethylpiperidine, 4-benzoyloxy-2,2,6,6-tetramethylpiperidine, bis-(2,2,6,6-tetramethyl-4-piperidyl)oxalate, bis-(2,2,6,6-tetramethyl-4-piperidyl)adipate, bis-(2,2,6,6-tetramethyl-4-piperidyl)terephthalate, 1,2-bis(2,2,6,6-tetramethyl-4-piperidyloxy)ethane, phenyl-1-naphthylamine, phenyl-2-naphthylamine, N,N'-diphenyl-1,4-phenylenediamine, N-phenyl-N'-cyclohexyl-1,4-phenylenediamine, or others.

As the phosphorus-containing antioxidant, for example, there may be mentioned triisodecyl phosphite, triphenyl phosphate, diphenylisodecyl phosphate, 2,2-methylenebis(4,6-di-t-butylphenyl)octyl phosphate, tris(2,4-di-t-butylphenyl) phosphate, tris(2-t-butylphenyl) phosphate, bis(2-t-butylphenyl)phenyl phosphite, tris[2-(1,1-dimethylpropyl)-phenyl] phosphite, tris(2-t-butyl-4-phenylphenyl) phosphate, or others.

The hydroquinone-series antioxidant includes, for example, 2,5-di-t-butylhydroquinone, or the like. The quinoline-series antioxidant includes, for example, 6-ethoxy-2,2,4-trimethyl-1,2-dihydroquinoline. As the sulfur-containing antioxidant, for example, there may be mentioned dilaurylthiodipropionate, or others.

The antioxidant(s) may be used singly or in combination. Among others, the preferred antioxidant is at least one member selected from the hindered phenol and the hindered amine, in particular the hindered phenol [e.g., a $C_{2-10}$alkylenediol-bis[(di-branched $C_{3-6}$alkylhydroxyphenyl)propionate]], a di- or trioxy$C_{2-4}$alkylenediol-bis[(di-branched $C_{3-6}$alkylhydroxyphenyl)propionate], a $C_{3-8}$alkylenetriol-bis[(di-branched $C_{3-6}$alkylhydroxyphenyl)propionate], a $C_{4-8}$alkylenetetraoltetrakis[(di-branched $C_{3-6}$alkylhydroxyphenyl)propionate)].

The proportion of the antioxidant may be selected a range of about 0.01 to 5 parts by weight, preferably about 0.05 to 2.5 parts by weight, and more preferably about 0.01 to 1 part by weight relative to 100 parts by weight of the polyacetal resin (A).

The weight ratio of the total of the phenol component (B1) and the amino acid (B2) relative to the antioxidant [the former/the latter] is about 99/1 to 10/90, preferably about 95/5 to 30/70, and more preferably about 90/10 to 50/50.

(Heat Stabilizer)

The heat stabilizer includes (a) a basic nitrogen-containing compound, (b) a metal salt of an organic carboxylic acid, (c) an alkali or alkaline earth metal compound, (d) a hydrotalcite, and (e) a zeolite.

(a) Basic Nitrogen-Containing Compound

The basic nitrogen-containing compound includes a low molecular compound or a high molecular compound (nitrogen-containing resin).

The low molecular weight compound includes, for example, an aliphatic amine (e.g., monoethanolamine, diethanolamine), an aromatic amine (e.g., o-, m-, or p-toluidine, an aromatic di- or triamine such as or o-, m-, or p-phenylenediamine, o-, m-, or p-aminobenzoic acid, ethyl o-, m-, or p-aminobenzoate), an amide compound (e.g., a polycarboxylic acid amide such as malonamide or isophthalic acid diamide, o-, m-, or p-aminobenzamide), a hydrazine or a derivative thereof [e.g., hydrazine, a hydrazone, a hydrazide such as a polycarboxylic acid hydrazide], an aminotriazine [e.g., guanamine or a derivative thereof, such as guanamine, acetoguanamine, benzoguanamine, succinoguanamine, adipoguanamine, phthaloguanamine, CTU-guanamine, 2,4-diamino-6-[2'-methylimidazolyl-(1')]-ethyl-s-triazine, 2,4-diamino-6-[2'-undecylimidazolyl-(1')]-ethyl-s-triazine, or 2,4-diamino-6-[2'-ethyl-4'-methylimidazolyl-(1')]-ethyl-s-triazine; amelamine or a derivative thereof (e.g., a melamine, a condensate of melamine, such as melam, melem or melon)], a uracil or a derivative thereof (e.g., uracil, uridine), a cytosine and a derivative thereof (e.g., cytosine, cytidine), a guanidine or a derivative thereof (e.g., a non-cyclic guanidine such as guanidine or cyanoguanidine; a cyclic guanidine such as creatinine), a urea or a derivative thereof [e.g., biuret, biurea, ethylene urea, acetylene urea, isobutylidene diurea, crotylidene diurea, a condensate of urea with formaldehyde, hydantoin, a substituted hydantoin derivative (e.g., a mono or di$C_{1-4}$alkyl-substituted compound such as 1-methylhydantoin, 5-propylhydantoin or 5,5-dimethylhydantoin; an aryl-substituted compound such as 5-phenylhydantoin or 5,5-diphenylhydantoin; and an alkylaryl-substituted compound such as 5-methyl-5-phenylhydantoin), allantoin, a substituted allantoin derivative (e.g., a mono, di or tri$C_{1-4}$alkyl-substituted compound, and an aryl-substituted compound), a metal salt of allantoin (e.g., a salt of allantoin with a metal element of the Group 3B of the Periodic Table of Elements, such as allantoin dihydroxyaluminium), a reaction product of allantoin with an aldehyde compound (e.g., an adduct of allantoin and formaldehyde), a compound of allantoin with an imidazole compound (e.g., allantoin sodium dl-pyrrolidonecarboxylate), an organic acid salt].

The nitrogen-containing resin includes, for example, an amino resin obtainable from a reaction by using formaldehyde (e.g., a condensation resin such as a guanamine resin, a melamine resin or a guanidine resin; a co-condensation resin such as a benzoguanamine-melamine resin or an aromatic polyamine-melamine resin), an aromatic amine-formaldehyde resin (e.g., aniline resin), a polyamide resin (e.g., a homo- or copolymerized polyamide such as nylon 3 (polyβ-alanine), nylon 46, nylon 6, nylon 66, nylon 11, nylon 12, nylon MXD6, nylon 6-10, nylon 6-11, nylon 6-12, nylon 6-66-610, or nylon 6-66-612, a substituted polyamide containing a methylol or alkoxymethyl group), a polyesteramide, a polyamideimide, a polyurethane, a polyacrylamide, a poly(N-vinylformamide), a copolymer of N-vinylformamide and other vinyl monomer, a poly(N-vinylcarboxylic acid amide), a copolymer of N-vinylcarboxylic acid amide and other vinyl monomer, or others.

The basic nitrogen-containing compound(s) may be used independently or in combination. Among others, the preferred basic nitrogen-containing compound includes a guanamine (e.g., adipoguanamine, CTU-guanamine), melamine or a derivative thereof [particularly, melamine or a melamine condensate (such as melam or melem)], a guanidine derivative (such as cyanoguanidine or creatinine), a urea derivative [e.g., biurea, a condensate of urea with formaldehyde, allantoin, and a metal salt of allantoin (such as allantoin dihydroxyaluminium)], a nitrogen-containing resin [e.g., an amino resin (an amino resin such as a melamine resin or a melamine-formaldehyde resin; a crosslinked amino resin such as a crosslinked melamine resin), a polyamide resin].

(b) Metal Salt of Organic Carboxylic Acid

The metal salt of the organic carboxylic acid includes a salt of an organic carboxylic acid with a metal (e.g., an alkaline metal such as Li, Na or K; an alkaline earth metal such as Mg or Ca; and a transition metal such as Zn).

As the organic carboxylic acid, there may be used a saturated or unsaturated aliphatic carboxylic acid, or a polymer of an unsaturated aliphatic carboxylic acid. Moreover, the aliphatic carboxylic acid may have a hydroxyl group.

The saturated aliphatic carboxylic acid includes a saturated $C_{1-34}$monocarboxylic acid (e.g., acetic acid, propionic acid, butyric acid, isobutyric acid, valeric acid, isovaleric acid, pivalic acid, caproic acid, caprylic acid, capric acid, lauric acid, myristic acid, pentadecylic acid, palmitic acid, stearic acid, arachic acid, behenic acid, montanic acid), a saturated $C_{2-30}$dicarboxylic acid (e.g., oxalic acid, malonic acid, succinic acid, glutaric acid, adipic acid, pimelic acid, cork acid, azelaic acid, sebacic acid, dodecanoic diacid, tetradecanoic diacid, thapsiaic acid (or thapsic acid)), and an oxy-acid thereof (e.g., glycolic acid, lactic acid, glyceric acid, hydroxybutyric acid, citric acid, 12-hydroxystearic acid).

The unsaturated aliphatic carboxylic acid includes an unsaturated $C_{3-34}$monocarboxylic acid [e.g., (meth)acrylic acid, crotonic acid, isocrotonic acid, myristoleic acid, palmitoleic acid, oleic acid, linoleic acid, linolenic acid, arachidonic acid, erucic acid], an unsaturated $C_{4-30}$dicarboxylic acid (e.g., maleic acid, fumaric acid, decenoic diacid, dodecenoic diacid), and an oxy-acid thereof (e.g., propiolic acid).

Moreover, exemplified as the polymer of the unsaturated aliphatic carboxylic acid is a copolymer of a polymerizable unsaturated carboxylic acid [e.g., an α,β-ethylene-type (ethylenic) unsaturated carboxylic acid, for example, a polymerizable unsaturated monocarboxylic acid (such as (meth)acrylic acid), a polymerizable unsaturated polycarboxylic acid (such as itaconic acid, maleic acid, fumaric acid), an anhydride of the polycarboxylic acid, a monoester of the polycarboxylic acid (e.g., a mono$C_{1-10}$alkylester of the polycarboxylic acid such as monoethyl maleate)] with an olefin (e.g., an α-$C_{2-10}$olefin such as ethylene or propylene).

The metal salt of the organic carboxylic acid may be used singly or in combination. Among others, the preferred metal salt of the organic carboxylic acid is a salt of an organic carboxylic acid with an alkaline earth metal (e.g., calcium acetate, calcium citrate, calcium stearate, magnesium stearate, calcium 12-hydroxystearate), an ionomer resin (a resin in which at least a part of carboxyl groups contained in the copolymer of the polymerizable unsaturated polycarboxylic acid with the olef in is neutralized withan ion(s) of the above-mentioned metal), and others. The ionomer resin is, for example, commercially available as "A-CACLYN" (manufactured by Allied Signal Inc.), "Himilan" (manufactured by Du Pont-Mitsui Polychemicals Co., Ltd.), "Surlyn" (manufactured by Du Pont), and others.

(c) Alkali or Alkaline Earth Metal Compound

The alkali or alkaline earth metal compound includes a metal oxide (such as CaO, MgO), a metal hydroxide (such as $Ca(OH)_2$, $Mg(OH)_2$), and a salt of an inorganic acid with a metal [e.g., a metal carbonate (such as $Na_2CO_3$, $K_2CO_3$, $CaCO_3$ or $MgCO_3$), a metal borate (such as $Ca_3(PO_4)_2$), a metal phosphate (such as $Mg_3(BO_3)_2$)]. The alkali or alkaline earth metal compound(s) may be used singly or in combination. Among the metal compounds, the metal oxide and the metal hydroxide, particularly the alkaline earth metal oxide and the alkaline earth metal hydroxide are preferred.

(d) Hydrotalcite

As the hydrotalcite, hydrotalcites recited in Japanese Patent Application Laid-Open No. 1241/1985 (JP-60-1241A) and Japanese Patent Application Laid-Open No. 59475/1997 (JP-9-59475A), such as hydrotalcite compounds represented by the following formula are usable.

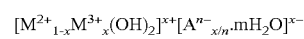

$$[M^{2+}_{1-x}M^{3+}_{x}(OH)_2]^{x+}[A^{n-}_{x/n}\cdot mH_2O]^{x-}$$

In the formula, $M^{2+}$ represents $Mg^{2+}$, $Mn^{2+}$, $Fe^{2+}$, $Co^{2+}$, or any of other divalent metal ions; $M^{3+}$ represents $Al^{3+}$, $Fe^{3+}$, $Cr^{3+}$, or any of other trivalent metal ions; $A^{n-}$ represents $CO_3^{2-}$, $OH^-$, $HPO_4^{2-}$, $SO_4^{2-}$, or any of other n– valent anions (particularly, monovalent or divalent an ion); x is $0<x<0.5$; and m is $0 \leq m<1$.

The hydrotalcites may be used singly or in combination. The hydrotalcite is available from Kyowa Chemical Industry Co., Ltd. under the trade name "DHT-4A", "DHT-4A-2", or "Alcamizer".

(e) Zeolite

Although there is no particular restriction as to the zeolite, such as zeolite recited in Japanese Patent Application Laid-Open No. 62142/1995 (JP-7-62142A) [zeolites the smallest unit cell of which is a crystalline aluminosilicate with an alkaline and/or alkaline earth metal (A-, X-, Y-, L-, and ZSM-type zeolites, mordenite-type zeolite; chabazite, mordenite, faujasite, and other naturally-occurring zeolites)] can be employed.

The zeolites may be used singly or in combination. Incidentally, A-type zeolite is available under the trade name "Zeolam A-3", "Zeolam A-4", or "Zeolam A-5", X-type zeolite under the trade name "Zeolam F-9", and Y-type zeolite under the trade name "HSZ-320NAA", from Tosoh Corp.

The heat stabilizer(s) may be used singly or in combination. It is also possible to impart thermal stability to a polyacetal resin by using at least one member selected from the foregoing components (b) to (e) in combination with the component (a), even though the amount of the heat stabilizer to be added is small. Moreover, the heat stabilizer preferably comprises at least one member selected from the group consisting of the foregoing components (b) and (c). The component (b) and/or (c) may be used in combination with the component (a).

The proportion of the heat stabilizer may be selected within the range of about 0.001 to 10 parts by weight, preferably about 0.001 to 5 parts by weight, and more preferably about 0.01 to 2 parts by weight relative to 100 parts by weight of the polyacetal resin (A). In the case of using the component (a) in combination with the components (b) to (e), the ratio or proportion of the polyacetal resin (A) relative to the total weight of the components (b) to (e) [(a)/[(b) and (e)]] is about 90/10 to 10/90, and preferably about 70/30 to 30/70.

The weight ratio of the total of the phenol component (B1) and the amino acid (B2) relative to the heat stabilizer is about 99/1 to 10/90, preferably about 95/5 to 30/70, and more preferably about 90/10 to 50/50.

(Processing Stabilizer)

The processing stabilizer includes at least one member selected from (a) a long-chain or higher fatty acid or a derivative thereof, (b) a polyoxyalkylene glycol, (c) a silicone-series compound, (d) a wax, and others.

(a) Long-Chain or Higher Fatty Acid or Derivative thereof

The higher fatty acid may be a saturated fatty acid or an unsaturated fatty acid. Moreover, a part of hydrogen atoms in the higher fatty acid may be substituted with a substituent(s) such as hydroxyl group. Such a higher fatty acid is exemplified by a mono- or di-carboxylic fatty acid having not less than 10 carbon atoms, for example, a saturated mono-carboxylic fatty acid having not less than 10 carbon atoms [e.g., a saturated $C_{10\text{-}34}$ fatty acid (preferably a saturated $C_{10\text{-}28}$ fatty acid) such as capric acid, lauric acid, myristic acid, pentadecylic acid, palmitic acid, stearic acid, arachic acid, behenic acid and montanic acid], an unsaturated mono-carboxylic fatty acid having not less than 10 carbon atoms [e.g., an unsaturated $C_{10\text{-}34}$ fatty acid (preferably an unsaturated $C_{10\text{-}28}$ fatty acid) such as oleic acid, linoleic acid, linolenic acid, arachidonic acid or erucic acid], a di-carboxylic fatty acid having not less than 10 carbon atoms (a dibasic fatty acid) [e.g., a saturated di-carboxylic $C_{10\text{-}30}$ fatty acid (preferably a saturated di-carboxylic $C_{10\text{-}20}$ fatty acid) such as sebacic acid, dodecanoic diacid, tetradecanoic diacid or hexadecanoic diacid: as well as an unsaturated di-carboxylic $C_{10\text{-}30}$ fatty acid (preferably an unsaturated di-carboxylic $C_{10\text{-}20}$ fatty acid) such as decenoic diacid or dodecenoic diacid]. The fatty acid also includes one which has one or a plurality of hydroxyl group(s) in the molecular (e.g., a hydroxy-saturated $C_{10\text{-}26}$ fatty acid such as 12-hydroxy stearic acid). The fatty acid(s) may be used singly or in combination.

The derivative of the higher fatty acid includes a fatty acid ester, a fatty acid amide, and others. As to the higher fatty acid ester, there is no particular limitation on its structure, and an ester of either a straight or branched chain fatty acid can be used. As the higher fatty acid ester, there maybe mentioned, for example, an ester of the above-mentioned higher fatty acid with an alcohol (e.g., an ester having one or a plurality of ester bond(s), such as a monoester, a diester, or a triester). There is no particular limitation on a species of the alcohol constituting the higher fatty acid ester, and the preferred alcohol is a polyhydric alcohol. The polyhydric alcohol includes a polyhydric alcohol having about 2 to 8 carbon atoms (preferably, about 2 to 6 carbon atoms) or a polymer thereof, for example, a diol exemplified by an alkylene glycol [e.g., a $C_{2\text{-}8}$alkylene glycol (preferably a $C_{2\text{-}6}$alkylene glycol) such as ethylene glycol, diethylene glycol or propylene glycol]; a triol exemplified by glycerin, trimethylolpropane, or a derivative thereof; a tetraol exemplified by pentaerythritol, sorbitan, or a derivative thereof; as well as a homo- or copolymer of the polyhydric alcohol(s) [e.g., a homo- or copolymer of a polyoxyalkylene glycol such as polyethylene glycol or polypropylene glycol, or polyglycerin]. The average degree of polymerization of the polyalkylene glycol is not less than 2 (e.g., about 2 to 500), preferably about 2 to 400 (e.g., about 2 to 300), and the preferred average degree of polymerization is not less than 16 (e.g., about 20 to 200). Such a polyalkylene glycol is preferably used on esterification with a fatty acid having not less than 12 carbon atoms. The preferred polyhydric alcohol is a polyalkylene glycol having the average degree of polymerization of not less than 2. The polyhydric alcohol(s) may be used singly or in combination.

Exemplified as such the ester of a fatty acid is ethylene glycol distearate, glycerin monostearate, glycerin tripalmitate, polyglycerin tristearate, trimethylolpropane monopalmitate, pentaerythritol monoundecylate, sorbitan monostearate, a monolaurate of a polyalkylene glycol (such as a polyethylene glycol or a polypropylene glycol), a monopalmitate of the polyalkylene glycol, a monostearate of the polyalkylene, glycol, a dilaurate of the polyalkylene glycol, a dipalmitate of the polyalkylene glycol, a distearate of the polyalkylene glycol, a dibehenate of the polyalkylene glycol, a dimontanate of the polyalkylene glycol, a dioleate of the polyalkylene glycol, or a dilinolate of the polyalkylene glycol. The ester of a fatty acid may be used singly or in combination.

The fatty acid amide includes an acid amide (e.g., monoamide and bisamide) of the higher fatty acid (a mono- or di-carboxylic higher fatty acid) with an amine (such as a monoamine, a diamine or a polyamine). As the monoamide, there may be mentioned, for example, a primary acid amide of a saturated fatty acid (such as capric acid amide, lauric acid amide, myristic acid amide, palmitic acid amide, stearic acid amide, arachic acid amide, behenic acid amide or montanic acid amide); a primary acid amide of an unsaturated fatty acid (such as oleic acid amide); and a secondary acid amide of a saturated and/or an unsaturated fatty acid with a monoamine (such as stearyl stearic acid amide or stearyl oleic acid amide). Among others, the preferred fatty acid amide is a bisamide. The bisamide includes a bisamide of the fatty acid with a $C_{1\text{-}6}$alkylenediamine (particularly, $C_{1\text{-}2}$alkylenediamine), concretely such as ethylenediamine-distearic acid amide (ethylenebisstearylamide), hexamethylenediamine-distearic acid amide, ethylenediamine-dioleic acid amide or ethylenediamine-dierucic acid amide. Furthermore, a bisamide in which different species of acyl groups are independently bonded to amine sites of an alkylenediamine, such as ethylenediamine-(stearic acid amide)oleic acid amide, may also be used. In the acid amide, it is preferred that the fatty acid constituting the acid amide is a saturated fatty acid. The fatty acid amide(s) may be used singly or in combination.

(b) Polyoxyalkylene Glycol

Exemplified as the polyoxyalkylene glycol is a homopolymer of an alkylene glycol [e.g., a $C_{2\text{-}6}$alkylene glycol (preferably a $C_{2\text{-}4}$alkylene glycol) such as ethylene glycol, propylene glycol or tetramethylene glycol], a copolymer thereof, and a derivative of the homopolymer or the copolymer. Specifically, the polyoxyalkylene glycol includes a poly$C_{2\text{-}6}$oxyalkylene glycol (preferably a poly$C_{2\text{-}}$ 4oxyalkylene glycol) such as a polyethylene glycol, a polypropylene glycol or a polytetramethylene glycol, a polyoxyethylene-polyoxypropylene copolymer (e.g., a random or block copolymer), a polyoxyethylenepolyoxypropylene glyceryl ether or a polyoxyethylenepolyoxypropylene monobutyl ether.

The polyoxyalkylene glycol may be used singly or in combination. Among these polyoxyalkylene glycols, a polymer having an oxyethylene unit (e.g., a polyethylene glycol, a polyoxyethylene-polyoxypropylene copolymer, and a derivative thereof) is preferred. Moreover, the number average molecular weight of the polyoxyalkylene glycol is about $1 \times 10^3$ to $1 \times 10^6$ (e.g., about $1 \times 10^3$ to $5 \times 10^5$), and preferably about $2 \times 10^3$ to $1 \times 10^5$ (e.g., about $2 \times 10^3$ to $5 \times 10^4$).

(c) Silicone-Series Compound

Exemplified as the silicone-series compound is a (poly) organosiloxane. The (poly)organosiloxane includes a monoorganosiloxane such as a dialkylsiloxane (e.g., dimethylsiloxane), an alkylarylsiloxane (e.g., methylphenylsiloxane), or a diarylsiloxane (e.g., diphenylsiloxane), a homopolymer thereof (for example, a polydimethylsiloxane, a polymethylphenylsiloxane), or a copolymer thereof. Moreover, as the polyorganosiloxane, there may be also mentioned a modified polyorganosiloxane having such a substituent(s) as epoxy, hydroxyl, carboxyl, amino, or ether group at an end or in the main chain of the molecule (e.g., a modified silicone). The silicone-series compound(s) may be used singly or in combination.

(d) Wax

The wax includes a polyolefinic wax, and the like. As the polyolefinic wax, there may be mentioned a poly$C_{2-4}$olefinic wax such as a polyethylene wax or a polypropylene wax, an olefinic copolymer wax such as an ethylene copolymer wax, and a partially oxided substance or mixture thereof. The olefinic copolymer includes, for example, a copolymer of an olefin (e.g., an α-olefin such as ethylene, propylene, 1-butene, 2-butene, isobutene, 3-methyl-1-butene, 4-methyl-1-butene, 2-methyl-2-butene, 4-methyl-1-pentene, 1-hexene, 2,3-dimethyl-2-butene, 1-heptene, 1-octene, 1-nonene, 1-decene, or 1-dodecene), a copolymer of the olefin and a copolymerizable monomer, for example, a polymerizable monomer such as an unsaturated carboxylic acid or an anhydride thereof [e.g., maleic anhydride, (meth) acrylic acid], or a (meth)acrylate [e.g., a $C_{1-10}$alkyl (meth) acrylate such as methyl (meth)acrylate, ethyl (meth)acrylate, propyl (meth)acrylate, butyl (meth)acrylate, or 2-ethylhexyl (meth)acrylate (preferably a $C_{1-4}$alkyl (meth)acrylate)]. Moreover, the copolymer includes a random copolymer, a block copolymer, or a graft copolymer. The olefinic copolymer wax is usually a copolymer of ethylene and at least one monomer selected from other olefin and a polymerizable monomer.

The wax(es) may be used singly or in combination. Among these waxes, a polyethylene wax is preferred. The number average molecular weight of the wax is about 100 to 20000, preferably about 500 to 15000, and more preferably about 1000 to 12000.

The processing stabilizer(s) may be used singly or in combination. The proportion of the processing stabilizer is about 0.01 to 10 parts by weight, preferably about 0.03 to 5 parts by weight (e.g., about 0.05 to 3 parts by weight), and particularly about 0.05 to 2 parts by weight relative to 100 parts by weight of the polyacetal resin (A).

(Weather (Light)-Resistant Stabilizer)

The weather (light)-resistant stabilizer is exemplified by (a) a benzotriazole-series compound, (b) a benzophenone-series compound, (c) an aromatic benzoate-series compound, (d) a cyanoacrylate-series compound, (e) an oxalic anilide-series compound, and (f) a hindered amine-series compound.

(a) Benzotriazole-Series Compound

The benzotriazole-series compound includes a benzotriazole having a hydroxyl group, and an aryl group substituted with an alkyl ($C_{1-6}$alkyl) group, such as 2-(2'-hydroxy-5'-methylphenyl)benzotriazole, 2-(2'-hydroxy-3',5'-di-t-butylphenyl)benzotriazole, 2-(2'-hydroxy-3',5'-di-t-amylphenyl)benzotriazole or 2-(2'-hydroxy-3',5'-di-isoamylphenyl) benzotriazole; a benzotriazole having a hydroxyl group, and an aryl group substituted with an aralkyl (or aryl) group, such as 2-[2'-hydroxy-3',5'-bis(α,α-dimethylbenzyl)phenyl] benzotriazole; a benzotriazole having a hydroxyl group, and an aryl group substituted with alkoxy ($C_{1-12}$alkoxy) group, such as 2-(2'-hydroxy-4'-octoxyphenyl)benzotriazole; and others. The benzotriazole compound(s) may be used singly or in combination. Among others, the preferred benzotriazole-series compound includes a benzotriazole having a hydroxyl group, and a $C_{6-10}$aryl (particularly, phenyl) group substituted with a $C_{3-6}$alkyl group, as well as a benzotriazole having a hydroxyl group, and an aryl group substituted with a $C_{6-10}$aryl-$C_{1-6}$alkyl (particularly, phenyl-$C_{1-4}$alkyl) group.

(b) Benzophenone-Series Compound

Exemplified as the benzophenone-series compound is a benzophenone having a plurality of hydroxyl groups (e.g., a di to tetrahydroxybenzophenone such as 2,4-dihydroxybenzophenone; a benzophenone having a hydroxyl group, and an aryl or aralkyl group substituted with a hydroxyl group, such as 2-hydroxy-4-oxybenzylbenzophenone); a benzophenone having a hydroxyl group and an alkoxy ($C_{1-16}$alkoxy) group (e.g., 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone); and others. The benzophenone-series compound(s) may be used singly or in combination. Among others, the preferred benzophenone-series compound includes a benzophenone having a hydroxyl group, and a $C_{6-10}$aryl (or $C_{6-10}$aryl-$C_{1-4}$alkyl) group substituted with a hydroxyl group, particularly one having a hydroxyl group, and a phenyl-$C_{1-2}$alkyl group substituted with a hydroxyl group.

(c) Aromatic Benzoate-Series Compound

The aromatic benzoate-series compound includes an alkylarylsalicylate such as p-t-butylphenylsalicylate or p-octylphenylsalicylate. The aromatic benzoate-series compound(s) may be used singly or in combination.

(d) Cyanoacrylate-Series Compound

Exemplified as the cyanoacrylate-series compound is a cyano group-containing diarylacrylate such as 2-ethylhexyl-2-cyano-3,3-diphenylacrylate or ethyl-2-cyano-3,3-diphenylacrylate. The cyanoacrylate-series compound(s) may be used singly or in combination.

(e) Oxalic Anilide-Series Compound

The oxalic anilide-series compound is exemplified by an oxalic diamide having an aryl group on a nitrogen atom in which the aryl group may have a substituent(s), exemplified by N-(2-ethylphenyl)-N'-(2-ethoxy-5-t-butylphenyl)oxalic diamide, or N-(2-ethylphenyl)-N'-(2-ethoxy-phenyl)oxalic diamide. The oxalic anilide-series compound(s) may be used singly or in combination.

(f) Hindered Amine-Series Compound

The hindered amine-series compound includes a piperidine derivative having a steric hindrance group, for example, an ester group-containing piperidine derivative [for example, an aliphatic acyloxypiperidine (e.g., a $C_{2-20}$aliphatic acyloxy-tetramethylpiperidine) such as 4-acetoxy-2,2,6,6-tetramethylpiperidine, 4-stearoyloxy-2,2,6,6-tetramethylpiperidine or 4-acryloyloxy-2,2,6,6-tetramethylpiperidine; an aromatic acyloxypiperidine (e.g., a $C_{7-11}$aromatic acyloxy-tetramethylpiperidine) such as 4-benzoyloxy-2,2,6,6-tetramethylpiperidine; an aliphatic di- or tricarboxylic acid-bis- or trispiperidyl ester (e.g., a $C_{2-20}$aliphatic dicarboxylic acid-bispiperidyl ester) such as bis(2,2,6,6-tetramethyl-4-piperidyl)oxalate, bis(2,2,6,6,-tetramethyl-4-piperidyl)malonate, bis(2,2,6,6-tetramethyl-4-piperidyl)adipate, bis(1,2,2,6,6-pentamethyl-4-piperidyl)adipate, bis(2,2,6,6-tetramethyl-4-piperidyl)sebacate or bis(1,2,2,6,6-pentamethyl-4-piperidyl)sebacate; an aromatic di- to tetracarboxylic acid-bis- to tetrakispiperidyl ester (e.g., an aromatic di- or tricarboxylic acid-bis- or trispiperidyl ester) such as bis(2,2,6,6-tetramethyl-4-piperidyl) terephthalate or tris(2,2,6,6-tetramethyl-4-piperidyl)benzene-1,3,5-tricarboxylate], an ether group-containing piperidine derivative [for example, a $C_{1-10}$alkoxypiperidine (e.g., a $C_{1-6}$alkoxy-tetramethylpiperidine) such as 4-methoxy-2,2,6,6-tetramethylpiperidine; a $C_{5-8}$cycloalkyloxy-piperidine such as 4-cyclohexyloxy-2,2,6,6-tetramethylpiperidine; an aryloxypiperidine such as 4-phenoxy-2,2,6,6-tetramethylpiperidine; a $C_{6-10}$aryl-$C_{1-4}$alkyloxy-piperidine such as 4-benzyloxy-2,2,6,6-tetramethylpiperidine; an alkylenedioxybispiperidine (e.g., a $C_{1-10}$alkylenedioxy-bispiperidine) such as 1,2-bis(2,2,6,6-tetramethyl-4-piperidyloxy)ethane], an amide group-containing piperidine derivative [for example, a carbamoyloxypiperidine such as 4-(phenylcarbamoyloxy)-2,2,6,6-tetramethylpiperidine; an alkylenedioxy-bis piperidine substituted with a carbamoyloxy group, e.g., bis(2,2,6,6-tetramethyl-4-piperidyl)hexamethylene-1,6-dicarbamate]. Moreover, the hindered amine-series compound also includes a polycondensate of piperidine derivatives having high molecular weight [e.g., polycondensate of dimethyl succinate and 1-(2-hydroxyethyl)-4-hydroxy-2,2,6,6-tetramethylpiperidine]. The hindered amine-series compound(s) may be used singly or in combination.

Among others, the preferred hindered amine-series compound includes the ester group-containing piperidine derivative, particularly, an aliphatic carboxylic acid-piperidyl ester (e.g., preferably a $C_{2-16}$aliphatic dicarboxylic acid-bispiperidyl ester, and more preferably a $C_{6-14}$aliphatic dicarboxylic acid-bistetramethylpiperidyl ester), as well as an aromatic di- or tricarboxylic acid-bis- or trispiperidyl ester.

The weather (light)-resistant stabilizer(s) may be used singly or in combination. The proportion of the weather (light)-resistant stabilizer is about 0.01 to 5 parts by weight, preferably about 0.01 to 2 parts by weight, and more preferably about 0.1 to 2 parts by weight relative to 100 parts by weight of the polyacetal resin (A). Moreover, in the weather (light)-resistant stabilizer, it is preferred to use the component (f) in combination with at least one member selected from other components (a) to (e). In particular, the hindered amine-series compound (f) is preferably used in combination with the benzotriazole-series compound (a). In this case, the weight ratio of the component (f) relative to the total of the components (a) to (e) [the former/the latter] is about 0/100 to 80/20, preferably about 10/90 to 70/30, and more preferably about 20/80 to 60/40.

(Coloring Agent)

The coloring agent includes various dyes or pigments. As the dye, a solvent dye is preferred, and includes an azo-series dye, an anthraquinone-series dye, a phthalocyanine-series dye and a naphthoquinone-series dye. The pigment may be used an inorganic pigment or an organic pigment.

Exemplified as the inorganic pigment is a titanium-series (titanium-containing) pigment, a zinc-series (zinc-containing) pigment, a carbon black (e.g., a furnace black, a channel black, an acetylene black, Ketjen black), an iron-series (iron-containing) pigment, a molybdenum-series (molybdenum-containing) pigment, a cadmium-series (cadmium-containing) pigment, a lead-series (lead-containing) pigment, a cobalt-series (cobalt-containing) pigment, and an aluminum-series (aluminum-containing) pigment.

The organic pigment is exemplified by an azo-series pigment, an anthraquinone-series pigment, a phthalocyanine-series pigment, a quinacridone-series pigment, a perylene-series pigment, a perinone-series pigment, an isoindoline-series pigment, a dioxazine-series pigment, or a threne-series pigment.

The coloring agent may be used singly or in combination. Among others, the use of a coloring agent having a high light-shielding effect [such as a carbon black, a titanium white (a titanium oxide), a phthalocyanine-series pigment or a perylene-series pigment], particularly a carbon black, ensures improvement in weather (light)-resistance of the polyacetal resin composition.

The proportion of the coloring agent is, for example, relative to 100 parts by weight of the polyacetal resin (A), about 0 to 5 parts by weight (e.g., about 0.01 to 5 parts by weight), preferably about 0.1 to 4 parts by weight, and more preferably about 0.1 to 2 parts by weight.

(Other Additive)

The polyacetal resin composition of the present invention may optionally contain a conventional additive(s) singly or in combination. As such a additive, there may be mentioned a mold-release agent (releasing agent), a nucleating agent, an antistatic agent, a slip-(friction/wear) improving agent, an impact resistance improver (impact modifier), a flame retardant, a surfactant, an aromatic agent, various polymers (e.g., an olefinic resin, a polyester-series resin, a urethane-series resin), a filler, or others. Moreover, if necessary the polyacetal resin composition may contain a resin excellent in weather (light)-resistance, for example, an acrylic resin [a homo- or copolymer of a $C_{1-10}$alkyl (meth)acrylate such as a polymethyl methacrylate], an acrylic core-shell polymer, or a polycarbonate-series resin.

[Production Process of Polyacetal Resin Composition]

The polyacetal resin composition of the present invention may be a particulate mixture or a molten mixture, and it may be prepared by mixing a polyacetal resin (A) with a phenol component (B1) and/or amino acid (B2), and if necessary, other additives, in a conventional manner. For example, the following methods may be utilized: (1) a process comprising mixing each component together, kneading and extruding the resulting mixture with a uniaxial or biaxial extruder to prepare a pellet, and molding the pellet to a shaped article, (2) a process comprising once making pellets (master batch) different in composition, mixing the pellets in a certain ratio (or diluting the pellets), and molding the mixture to give a shaped article having a predetermined composition, or (3) a process comprising putting a pelletized polyacetal resin in contact with the inhibitor by means of spraying or surface-coating for adhesion, and molding the resultant to give a shaped article having a certain composition.

The resin composition of the present invention is useful in fabricating a variety of shaped articles by such a conventional method as injection molding, extrusion molding, compression molding, blow molding, vacuum molding, foam molding, rotation molding, or gas injection molding.

[Shaped Article]

The polyacetal resin article of the present invention formed with the above-mentioned polyacetal resin composition comprises (contains) a polyacetal resin (A) and a phenol component (B1) and/or amino acid (B2) in combination, and has excellent weather (light)-resistance with having extremely small amount of emission (or generation) of formaldehyde. In other words, shaped articles molded from the conventional polyacetal resin compositions containing antioxidants and other stabilizers liberate relatively large amounts of formaldehyde, cause corrosion and discoloration, and contaminate the living and working environment. For example, the formaldehyde emission of commercial ordinary polyacetal resin articles is about 2 to 5 μg per one $cm^2$ of surface area under dry conditions (in a constant-temperature dry atmosphere).

On the other hand, the formaldehyde emission of the polyacetal resin article of the present invention is not more than 2 μg (about 0 to 1.5 μg) per one $cm^2$ of surface area of the shaped article under dry conditions, and preferably about 0 to 1 μg.

The formaldehyde emission under dry conditions can be determined as follows.

After the shaped article of polyacetal resin is cut where necessary and its surface area is measured, a suitable portion of the article (e.g. the amount equivalent to a surface area of about 10 to 50 $cm^2$) is placed in a vessel (20 ml capacity) to seal and stand (or maintain) at a temperature of 80° C. for 24 hours. Then, this sealed vessel is charged with 5 ml of water and the formaldehyde in the aqueous solution is assayed in accordance with JIS K0102, 29 (under the heading of Formaldehyde) to calculate the formaldehyde emission (μg/$cm^2$) per unit surface area of the shaped article.

The above quantitative limitation on formaldehyde emission in the present invention is valid not only for shaped articles formed with spolyacetal resin compositions comprising the polyacetal resin (A), and the phenol component (B1) and/or amino acid (B2) and, with or without the conventional additives (e.g., a conventional antioxidant, stabilizer, or coloring agent), but also for shaped articles molded from comparable resin compositions containing an inorganic filler and/or other polymers, only if a major part of the surface of the article (for example, 50 to 100% of the total surface area) is constituted by a resin (for example, a multi-colored article or a coated article).

The shaped article of the present invention finds application in any field of use where formaldehyde is objectionable (for example, knobs and levers for use as automotive parts) and can also be used advantageously as parts and members in a variety of fields inclusive of automotive parts, electrical and electronic component (driving component and driven component) parts, architectural members and pipeline installation parts, household and cosmetic product parts, medical device (for diagnostic or therapeutic use) parts, and photographic devices (or parts).

More specifically, the automotive parts include but are not limited to car interior parts such as the inner handle, fuel trunk opener, seat belt buckle, assist lap, various switches, knob, lever, clip, and speaker grille, electrical system parts such as meters and connectors, in-vehicle electrical and electronic parts or mountings related to audio equipment and car navigation equipment, parts in contact with metals (typically the window regulator carrier plate), door lock actuator parts, mirror parts, wiper motor system parts, and fuel system parts.

The electrical or electronic component parts (the mechanical parts) includes, for example, parts or members constituted with polyacetal resin articles and fitted with a number of metal contacts [e.g. audio equipments such as the cassette tape recorder, video equipment such as the video tape recorder (VTR), 8 mm or other video camera, etc., office automation (OA) equipment such as copying machines, facsimile, word processor, computer, etc., toys actuated by the driving force of an electric motor or a spring, a telephone, a keyboard as an accessory to a computer or the like]. To be specific, there can be mentioned the chassis, gear, lever, cam, pulley, and bearing. Furthermore, the invention is applicable to optical and magnetic recording medium parts at least partly made of molded polyacetal resin (e.g., metal thin-film magnetic tape cassette, magnetic disk cartridge, opticomagnetic disc cartridge) and more particularly, the metal tape cassette for music, digital audio tape cassette, 8 mm video tape cassette, flexible disk cartridge, minidisk cartridge, etc. As specific optical and magnetic medium parts, there can be mentioned tape cassette parts (e.g., tape cassette body, reel, hub, guide, roller, stopper, lid) and disk cartridge parts (e.g., disk cartridge body (case), shutter, cramping plate).

In addition, the shaped article of polyacetal resin according to the invention may be used with advantage in lighting equipment parts, architectural members and pipeline parts such as interior architectural members, piping, cock, faucet, toilet-related parts, etc., abroad range of products related to daily living, cosmetic products, medical devices, and photographic devices, for example fastener (such as slide fastener, snap fastener, hoop-and-loop fastener, rail fastener), stationery, lipcream or lipstick cases, cleansing device, water cleaner, spray nozzle, spray device or container, aerosol container, general vessels, syringe holder, parts for (digital) camera, and peripheral parts (or member) of films.

Since the polyacetal resin composition of the present invention comprises a small amount of the phenol component and/or amino acid, the polyacetal resin composition achieves improvement of thermal stability, in particular melt stability in a molding process of the polyacetal resin composition. Moreover, addition of a small amount of the above-mentioned components ensures inhibition (or suppression) of formaldehyde emission at an extremely low level from the polyacetal resin and a shaped article thereof, and realizes to excellently improve the circumferential environment (e.g., working environment and using environment). Furthermore, the polyacetal resin composition of the present invention achieves inhibit formaldehyde emission or additive bleeding even under severe conditions to suppress: deposition of decomposition products on the mold (mold deposit); blooming or bleeding of such products or additives from a shaped article; and thermal deterioration of the article thus contributing, to upgrading of the quality and moldability of the shaped article.

EXAMPLES

The following examples are intended to describe this invention in further detail and should by no means be interpreted as defining the scope of the invention.

Incidentally, referring to the examples and comparative examples, moldability (the amount of the deposit on the mold), and the amount of emission of formaldehyde from the molded (or shaped) articles under dry condition were evaluated based on the following methods. Moreover, polyacetal resins, phenols, amino acids, antioxidants, heat stabilizers, processing stabilizers, weather (light)-resistant stabilizers and coloring agents used in the Examples and Comparative Examples are as described below.

[Moldability (the Amount of the Deposit on the Mold)]

A pellet formed with a polyacetal resin composition was continuously or successively shaped or molded by using a injection molding machine (1,000 shots) to obtain a certain-shaped article (20 mm in diameter and 1 mm in thickness), and the degree of the deposition on the mold was evaluated and classified into five grades. Incidentally, the smaller the number of the grade is, the lower or smaller the amount of the deposit is, namely the lower or smaller the amount of the mold deposit is.

[The Amount of Emission of Formaldehyde from the Molded Article in a Dry Environment]

Each resin sample consisting of 10 testpieces (2 mm×2 mm×50 mm; total surface area of about 40 cm$^2$) was placed in a vessel (capacity 20 ml) to seal and heated in a constant temperature oven at 80° C. for 24 hours. After air-cooling to room temperature, 5 ml of distilled water was injected into the vessel using a syringe. The formaldehyde content of this aqueous solution was determined in accordance with JIS K0102, 29 (under the heading of Formaldehyde) and the formaldehyde gas emission per surface area (μg/cm$^2$) was calculated.

[Additive Bleeding (or Blooming Property)]

Each testpiece of the shaped article (20 mm in diameter and 1 mm in thickness) was subjected to heat treatment at 130° C. for 5 hours in a gear oven. Then, the surface of the shaped article was visually observed to evaluate in the degree of bleeding, and classified into following three grades.
"A": no bleeding was observed
"B": slight bleeding was observed
"C": extremely heavy bleeding was observed

[Weather (Light)-Resistance]

A plate-molded article (70 mm×40 mm×3 mm) was subjected to an irradiation test with a weather meter [manufactured by Suga Test Instruments Co., Ltd., WEL-SUN-HCH type] for 600 hours in a fade condition at 83° C.

The change of color and the change of gloss between before and after the irradiation were observed, then evaluated and classified into five grades, respectively. The smaller the number of the grade is, the smaller the degree of the change is, namely the smaller the deterioration of gloss and the degree of discoloration is.

[Polyacetal Resin "A"]
A-1: Copolymer of polyacetal resin (melt index=9 g/10 min.)
A-2: Pellet of a polyacetal resin copolymer composition prepared in Comparative Example 1
A-3: Pellet of a polyacetal resin copolymer composition prepared in Comparative Example 4

Incidentally, the melt index is a value (g/10 minute) determined according to ASTM-D1238, and in the condition of using 2169 g of the resin at a temperature of 190° C.

[Phenol Component "B1"]
B1-1: Novolak phenol resin ["SUMILITE RESIN PR-53647" manufactured by Sumitomo Durez Co., Ltd.]
B1-2: Phenol aralkyl resin ["MILEX XL-225" manufactured by Mitsui Chemicals, Inc.]
B1-3: Polyvinyl phenol ["MARUKA LYNCUR S-1P" manufactured by Maruzen Petrochemical Co., Ltd.]
B1-4: Copolymer of vinylphenol and 2-hydroxyethyl methacrylate ["MARUKA LYNCUR CHM" manufactured by Maruzen Petrochemical Co., Ltd.]
B1-5: Copolymer of vinylphenol and methyl methacrylate ["MARUKA LYNCUR CMM" manufactured by Maruzen Petrochemical Co., Ltd.]
B1-6: 1,3,5-tris[2-(4-hydroxyphenyl)propyl]benzene ["TRIS TC" Mitsui Chemicals, Inc.]
B1-7: Catechin ["SUNFLAVON HG" manufactured by Taiyo Kagaku Co., Ltd.]

[Amino Acid "B2"]
B2-1: L-histidine
B2-2: L-tyrosine
B2-3: L-phenylalanine
B2-4: DL-tryptophan
B2-5: DL-hexahydropicolinic acid

[Antioxidant "C"]
C-1: Triethylene glycol-bis[3-(3-t-butyl-5-methyl-4-hydroxyphenyl)propionate]
C-2: Pentaerythritol tetrakis[3-(3,5-di-t-butyl-4-hydroxyphenyl)propionate]

[Heat Stabilizer "D"]
D-1: Melamine
D-2: Melamine resin
D-3: CTU-guanamine
D-4: Master batch pellet containing 3% by weight of allantoin. The master batch was prepared by extruding allantoin [manufactured by Kawaken Fine Chemicals Co., Ltd.] and a copolymer of polyacetal resin ["Duracon M90" manufactured by Polyplastics Co., Ltd.].
D-5: Biurea
D-6: Adipic dihydrazide

[Heat Stabilizer "E"]
E-1: calcium 12-hydroxystearate
E-2: magnesium stearate
E-3: magnesium oxide

[Processing Stabilizer "F"]
F-1: Ethylenebisstearylamide
F-2: Glycerin monostearate
F-3: Polyethylene glycol (molecular weight: 35000)
F-4: Polyethylene glycol monostearate ("NONION S-40" manufactured by NOF Corporation)

[Weather (Light)-Resistant Stabilizer "G"]
G-1: 2-[2'-hydroxy-3',5'-bis(α,α-dimethylbenzyl)phenyl]benzotriazole
G-2: 2-[2'-hydroxy-3',5'-di-t-amylphenyl]benzotriazole
G-3: 2-hydroxy-4-oxybenzylbenzophenone

[Weather (Light)-Resistant Stabilizer "H"]
H-1: Bis(2,2,6,6-tetramethyl-4-piperidyl)sebacate

[Coloring Agent "I"]
I-1: Carbon black (acetylene black)
I-2: Phthalocyanine-series blue pigment
I-3: Titanium oxide

Examples 1 to 26 and Comparative Examples 1 to 5

One hundred (100) parts by weight of a polyacetal resin was mixed with a phenol component, an amino acid, an antioxidant, a heat stabilizer(s), a processing stabilizer, a weather (light)-resistant stabilizer(s) and a coloring agent in the proportions indicated in Tables 1 and 2, and each mixture was melt-extruded using a biaxial extruder to prepare pelletized compositions. From the pellets, prescribed testpieces were fabricated with an injection molding machine, and the mold deposit on molding and additive bleeding were evaluated. Moreover, the amount of emission of formaldehyde from each of prescribed testpieces was measured. Further, the weather (light)-resistant stability of the prescribed testpieces was evaluated. The results are shown in Tables 1 and 2.

For comparison, samples prepared without addition of the phenol component and the amino acid, without addition of the weather (light)-resistant stabilizer and with addition of large amount of the phenol component were similarly evaluated. The results are shown in Table 3.

Examples 27 to 35

To a pellet-like resin composition prepared in Comparative Example 1 were added and mixed a given amount of a phenol component or amino acid, and a given amount of a heat stabilizer "D". Using the resulting pellet, prescribed testpieces were fabricated with an injection molding machine, and the mold deposit on molding and additive bleeding were evaluated. Moreover, the amount of emission of formaldehyde from the prescribed testpiece was measured. Further, in Examples 34 and 35, weather (light)-resistance of the molded prescribed testpiece was evaluated. The results are shown in Table 4.

TABLE 1

|  | Examples | | | | | | | | | | | | | | | |
|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 |
| Polyacetal resin "A" (parts by weight) | A-1 100 | A-1 100 | A-1 100 | A-1 100 | A-1 100 | A-1 100 | A-1 100 | A-1 100 | A-1 100 | A-1 100 | A-1 100 | A-1 100 | A-1 100 | A-1 100 | A-1 100 | A-1 100 |
| Phenol component "B1" (parts by weight) | B1-1 0.3 | B1-2 0.3 | B1-3 0.3 | B1-4 0.3 | B1-5 0.3 | B1-1 0.2 | B1-4 0.2 | B1-6 0.1 | — | — | — | — | — | — | — | B1-4 0.1 |
| Amino acid "B2" (parts by weight) | — | — | — | — | — | — | — | — | B2-1 0.3 | B2-2 0.3 | B2-3 0.3 | B2-4 0.3 | B2-5 0.3 | B2-1 0.2 | B2-2 0.2 | B2-3 0.1 |
| Antioxidant "C" (parts by weight) | C-1 0.3 | C-2 0.3 | C-1 0.3 | C-1 0.3 | C-1 0.3 | C-1 0.3 | C-1 0.3 | C-1 0.3 | C-1 0.3 | C-2 0.3 | C-1 0.3 | C-1 0.3 | C-1 0.3 | C-1 0.3 | C-1 0.3 | C-1 0.3 |
| Heat stabilizer "D" (parts by weight) | — | — | — | — | — | D-1 0.1 | D-2 0.1 | D-3 0.2 | — | — | — | — | — | D-1 0.1 | D-2 0.1 | D-3 0.1 |
| "E" | E-1 0.1 | E-2 0.1 | E-1 0.1 | E-3 0.1 | E-1 0.1 | E-1 0.1 | E-1 0.1 | E-1 0.1 | E-1 0.1 | E-2 0.1 | E-1 0.1 | E-1 0.1 | E-1 0.1 | E-1 0.1 | E-1 0.1 | E-1 0.1 |
| Processing stabilizer "F" (parts by weight) | F-1 0.2 | F-2 0.2 | F-3 0.2 | F-1 0.2 | F-1 0.2 | F-1 0.2 | F-1 0.2 | F-1 0.2 | F-1 0.2 | F-2 0.2 | F-2 0.2 | F-1 0.2 | F-1 0.2 | F-1 0.2 | F-1 0.2 | F-1 0.2 |
| Mold deposit | 3 | 3 | 3 | 3 | 3 | 2 | 2 | 1 | 1 | 1 | 1 | 1 | 1 | 2 | 1 | 1 |
| The amount of formaldehyde emission dry ($\mu g/cm^2$) | 0.9 | 0.9 | 0.8 | 0.7 | 0.8 | 0.7 | 0.9 | 0.7 | 0.8 | 0.8 | 0.9 | 0.9 | 0.9 | 0.7 | 0.8 | 0.7 |
| Blooming property | A | A | A | A | A | B | A | A | A | A | A | A | A | A | A | A |

TABLE 2

|  | Examples | | | | | | | | | |
|---|---|---|---|---|---|---|---|---|---|---|
|  | 17 | 18 | 19 | 20 | 21 | 22 | 23 | 24 | 25 | 26 |
| Polyacetal resin "A" (parts by weight) | A-1 100 | A-1 100 | A-1 100 | A-1 100 | A-1 100 | A-1 100 | A-1 100 | A-1 100 | A-1 100 | A-1 100 |
| Phenol component "B1" (parts by weight) | B1-4 0.3 | — | — | — | — | — | B1-5 0.1 | — | — | — |
| Amino acid "B2" (parts by weight) | — | B2-1 0.3 | B2-2 0.3 | B2-1 0.3 | B2-2 0.3 | B2-3 0.3 | — | B2-1 0.3 | B2-2 0.3 | B2-3 0.3 |
| Antioxidant "C" (parts by weight) | C-1 0.03 | C-1 0.03 | C-2 0.03 | C-1 0.03 | C-1 0.03 | C-1 0.03 | C-1 0.03 | C-1 0.03 | C-1 0.03 | C-1 0.03 |
| Heat stabilizer "D" (parts by weight) | — | — | — | — | — | — | D-3 0.2 | — | — | — |
| "E" | E-1 0.1 | E-1 0.1 | E-1 0.1 | E-1 0.1 | E-1 0.1 | E-1 0.1 | E-1 0.1 | E-1 0.1 | E-1 0.1 | E-1 0.1 |
| Processing stabilizer "F" (parts by weight) | F-1 0.2 | F-1 0.2 | F-1 0.2 | F-1 0.2 | F-1 0.2 | F-1 0.2 | F-1 0.2 | F-1 0.2 | F-2 0.2 | F-1 0.2 |
| Weather (light)-resistant stabilizer (parts by weight) "G" | G-1 0.4 | G-2 0.5 | G-3 0.25 | G-1 0.4 | G-1 0.4 | G-1 0.4 | G-1 0.4 | G-1 0.4 | G-1 0.4 | G-1 0.4 |
| "H" | H-1 0.2 | — | H-1 0.25 | H-1 0.2 | H-1 0.2 | H-1 0.2 | H-1 0.2 | H-1 0.2 | H-1 0.2 | H-1 0.2 |
| Coloring agent "I" (parts by weight) | — | — | — | — | — | — | I-1 0.5 | I-1 0.5 | I-2 0.5 | I-3 0.5 |
| Mold deposit | 3 | 3 | 3 | 3 | 3 | 2 | 1 | 1 | 1 | 1 |

TABLE 2-continued

|  | Examples | | | | | | | | | |
| --- | --- | --- | --- | --- | --- | --- | --- | --- | --- | --- |
|  | 17 | 18 | 19 | 20 | 21 | 22 | 23 | 24 | 25 | 26 |
| The amount of formaldehyde emission dry (µg/cm²) | 0.9 | 0.9 | 0.9 | 0.9 | 0.9 | 0.8 | 0.9 | 0.8 | 0.8 | 0.8 |
| Blooming property | A | A | A | A | A | A | A | A | A | A |
| Weather (light)-resistance | 3 | 2 | 1 | 1 | 1 | 1 | 2 | 1 | 1 | 1 |

TABLE 3

|  |  | Comparative Examples | | | | |
| --- | --- | --- | --- | --- | --- | --- |
|  |  | 1 | 2 | 3 | 4 | 5 |
| Polyacetal resin "A" (parts by weight) |  | A-1 100 | A-1 100 | A-1 100 | A-1 100 | A-1 100 |
| Phenol component "B1" (parts by weight) |  | — | — | B1-1 3.0 | — | — |
| Amino acid "B2" (parts by weight) |  | — | — | — | — | — |
| Antioxidant "C" (parts by weight) |  | C-1 0.3 | C-1 0.3 | C-1 0.3 | C-1 0.03 | C-1 0.03 |
| Heat stabilizer | "D" (parts by weight) | — | D-1 0.3 | — | — | D-1 0.3 |
|  | "E" | E-1 0.1 | E-1 0.1 | E-1 0.1 | E-1 0.1 | E-1 0.1 |
| Processing stabilizer "F" (parts by weight) |  | F-1 0.2 | F-1 0.2 | F-1 0.2 | F-1 0.2 | F-1 0.2 |
| Weather (light)-resistant stabilizer | "G" | — | — | — | G-1 0.2 | G-1 0.2 |
| (parts by weight) | "H" | — | — | — | H-1 | H-1 |
| Coloring agent "I" (parts by weight) |  | — | — | — | — | — |
| Mold deposit |  | 2 | 5 | 4 | 2 | 5 |
| The amount of formaldehyde emission dry (µg/cm²) |  | 2.9 | 1.0 | 1.9 | 3.2 | 2.1 |
| Blooming property |  | A | C | B | A | C |
| Weather (light)-resistance |  | 5 | 5 | 5 | 1 | 1 |

TABLE 4

|  | Examples | | | | | | | | |
| --- | --- | --- | --- | --- | --- | --- | --- | --- | --- |
|  | 27 | 28 | 29 | 30 | 31 | 32 | 33 | 34 | 35 |
| Polyacetal resin "A" (parts by weight) | A-2 100 | A-2 100 | A-2 100 | A-2 100 | A-2 100 | A-2 100 | A-2 100 | A-3 100 | A-3 100 |
| Phenol component "B1" (parts by weight) | B1-3 0.3 | — | — | — | B1-7 0.01 | — | — | — | — |
| Amino acid "B2" (parts by weight) | — | B2-1 0.3 | B2-2 0.3 | B2-3 0.3 | — | B2-1 0.3 | B2-2 0.3 | B2-1 0.3 | B2-2 0.3 |
| Heat stabilizer "D" (parts by weight) | — | — | — | — | D-4 1.0 | D-5 0.1 | D-6 0.1 | — | — |
| Mold deposit | 2 | 1 | 1 | 1 | 1 | 1 | 1 | 1 | 1 |
| The amount of formaldehyde emission dry (µg/cm²) | 0.8 | 0.6 | 0.7 | 0.8 | 0.3 | 0.5 | 0.6 | 0.9 | 0.9 |
| Blooming property | A | A | A | A | A | A | A | A | A |
| Weather (light)-resistance | — | — | — | — | — | — | — | 1 | 1 |

It will be apparent from Tables that as compared with the resin compositions of Comparative Examples, the resin compositions according to Examples have smaller amount of mold deposit and lower additive bleeding on molding, and are improved in moldability, and external appearance of the resultant shaped articles. Further, the resin compositions can considerably decrease or reduce the amount of formaldehyde emission, and therefore the circumferential environment can be drastically improved. In addition, the resin compositions of Examples ensure improvement in weather (light)-resistance of the resultant shaped articles.

What is claimed is:

1. A polyacetal resin composition which comprises
   a polyacetal resin (A);
   at least one member selected from the group consisting of a phenol component (B1) and an amino acid (B2), wherein the phenol component (B1) comprises at least one member selected from the group consisting of (i) a resin of which a main chain or a side chain has an aromatic ring having a hydroxyl group and (ii) a polyphenol selected from the group consisting of a polyhydric phenol, a trisphenol, a catechin compound, a teanine, a tannin and a lignin, and the amino acid (B2) comprises at least one member selected from the group consisting of an α-amino acid, a β-amino acid, a γ-amino acid and a δ-amino acid,
   a phenol-series antioxidant,
   a heat stabilizer selected from the group consisting of a basic nitrogen-containing compound, a metal salt of an organic carboxylic acid, and an alkali or alkaline earth metal compound; and
   a processing stabilizer selected from the group consisting of a long-chain or higher fatty acid or a derivative thereof, a polyoxyalkylene glycol, and a silicone-series compound; wherein the composition is substantially free from a phosphorus-containing flame retardant; and wherein the proportion of the phenol component (B1) is 0.001 to 1 part by weight and the proportion of the amino acid (B2) is 0.001 to 10 parts by weight relative to 100 parts by weight of the polyacetal resin (A), and wherein the proportions of the antioxidant, the heat stabilizer and processing stabilizer are 0.01 to 5 parts by weight, 0.001 to 10 parts by weight, and 0.01 to 10 parts by weight, respectively, relative to 100 parts by weight of the polyacetal resin (A).

2. A composition according to claim 1, wherein the phenol component (B1) comprises at least one member selected from the group consisting of a novolak phenol-series resin, a phenol aralkyl-series resin, a polyvinyl phenol-series resin, a polyhydric phenol, a trisphenol, a catechin compound, a teanine, a tannin and a lignin.

3. A composition according to claim 1, wherein the phenol component (B1) comprises at least one member selected from the group consisting of a novolak random phenol-series resin, a high-orthonovolak phenol-series resin, a vinylphenol homo- or copolymer, a catechin compound and a lignin.

4. A composition according to claim 1, wherein the amino acid (B2) comprises at least one α-amino acid selected from the group consisting of a monoaminomonocarboxylic acid, a monoaminodicarboxylic acid, and a diaminomonocarboxylic acid.

5. A composition according to claim 1, wherein the proportion of the phenol component (B1) is 0.001 to 0.7 part by weight relative to 100 parts by weight of the polyacetal resin (A).

6. A composition according to claim 1, the proportion of the amino acid (B2) is 0.01 to 5 parts by weight relative to 100 parts by weight of the polyacetal resin (A).

7. A composition according to claim 1, which further comprises at least one member selected from the group consisting of a weather (light)-resistant stabilizer and a coloring agent.

8. A composition according to claim 7, wherein the weight ratio of at least one member selected from the group consisting of the phenol component (B1) and the amino acid (B2) relative to the antioxidant is 99/1 to 10/90.

9. A composition according to claim 7, wherein the weight ratio of at least one member selected from the group consisting of the phenol component (B1) and the amino acid (B2) relative to the heat stabilizer is 99/1 to 10/90.

10. A shaped article formed with a composition recited in claim 1.

11. A shaped article according to claim 10, wherein (1) the emission of formaldehyde from the shaped article which is maintained in a closed space for 24 hours at a temperature of 80° C. is not more than 2 µg per one $cm^2$ of the surface area of the article.

12. A shaped article according to claim 10, which is at least one member selected from the group consisting of an automotive part, an electric or electronic device part, an architectural or pipeline part, a household utensil or cosmetic article part, a medical device part and a photographic device part.

* * * * *